US008403725B2

(12) United States Patent
Honegger et al.

(10) Patent No.: US 8,403,725 B2
(45) Date of Patent: Mar. 26, 2013

(54) METHOD AND DEVICE FOR MACHINING WORKPIECES

(75) Inventors: Daniel Honegger, Zizers (CH); Hugo Thurnherr, St. Gallen (CH); Claus P. Keferstein, Werdenberg (CH); Bernard Gschwend, Kronbühl (CH); Markus Ritter, Grenchen (CH)

(73) Assignee: L. Kellenberger & Co. AG, St. Gallen ( * ) Notice: Subject to any disclaimer, the term of this patent is extended or adjusted under 35 U.S.C. 154(b) by 297 days.

(21) Appl. No.: 12/673,591

(22) PCT Filed: Aug. 18, 2008

(86) PCT No.: PCT/CH2008/000351
§ 371 (c)(1),
(2), (4) Date: Feb. 16, 2010

(87) PCT Pub. No.: WO2009/023979
PCT Pub. Date: Feb. 26, 2009

(65) Prior Publication Data
US 2011/0009031 A1 Jan. 13, 2011

(30) Foreign Application Priority Data
Aug. 17, 2007 (CH) ....................... 1298/07

(51) Int. Cl.
*B24B 49/00* (2012.01)
(52) U.S. Cl. .......... 451/6; 451/10; 451/11; 451/57; 451/228; 451/251

(58) Field of Classification Search ............. 451/6, 10, 451/11, 57–58, 228, 251; 73/1.79; 700/164, 700/174; 702/33, 44
See application file for complete search history.

(56) References Cited

U.S. PATENT DOCUMENTS

| 5,616,070 | A * | 4/1997 | Rice et al. ............... 451/62 |
| 5,625,446 | A * | 4/1997 | Bedard ............... 356/3.08 |
| 6,014,965 | A * | 1/2000 | Nishida ............... 125/12 |
| 6,027,019 | A * | 2/2000 | Kou ............... 235/375 |
| 6,244,930 | B1* | 6/2001 | Archilla ............... 451/6 |
| 6,511,364 | B2* | 1/2003 | Ido et al. ............... 451/10 |
| 6,561,882 | B2* | 5/2003 | Mizutani et al. ............... 451/58 |
| 6,633,379 | B2* | 10/2003 | Roesner et al. ............... 356/301 |
| 6,749,377 | B2* | 6/2004 | Gottschald et al. ............... 409/132 |
| 6,802,759 | B1* | 10/2004 | Melkert ............... 451/5 |
| 6,883,711 | B2* | 4/2005 | Patton ............... 235/462.14 |
| 7,077,726 | B2* | 7/2006 | Pietsch et al. ............... 451/41 |
| 2008/0014836 | A1* | 1/2008 | Meusburger et al. ............... 451/5 |

FOREIGN PATENT DOCUMENTS

DE 36 10 160 10/1986
DE 102 05 212 8/2003
(Continued)

OTHER PUBLICATIONS

International Search Report—Dec. 29, 2008.
(Continued)

*Primary Examiner* — George Nguyen
(74) *Attorney, Agent, or Firm* — Da Vinci Partners LLC

(57) ABSTRACT

An apparatus and method for machining workpieces is provided, in particular, for grinding the surface of non-round workpieces. The workpiece is clamped within a machining unit and the surface of this workpiece is contactlessly measured by means of a measuring device while the workpiece is clamped within the machine.

20 Claims, 5 Drawing Sheets

FOREIGN PATENT DOCUMENTS

| | | |
|---|---|---|
| EP | 1 747 848 | 1/2007 |
| JP | 2002-028859 | 1/2002 |
| JP | 2003-136368 | 5/2003 |

OTHER PUBLICATIONS

Internet site re Fanuc Robonano, Nanochecker www.fanuc.co.jp/en/product/robonano/index.htm—Jul. 6, 2010.

Sirat G Y, Paz F, Agronik G, Wilner K: "Conoscopic Systems and Conoscopic Holography", Sep. 26, 2005, XP55043594, found in the internet: URL: http://mecadserv1.technion.ac.il/publichtml/IK05/Sirat_9375.pdf (found Nov. 8, 2012), entire document.

Weber T: "Conoscopic 3D measurement system", Sensor Review, IFS Publications; Bedford; GB; vol. 20, No. 3, Jan. 1, 2000, pp. 202-205, XP002418743, ISSN: 0260-2228; DOI: 10.1108/02602280010372331, entire document.

\* cited by examiner

METHOD AND DEVICE FOR MACHINING WORKPIECES

CROSS REFERENCE TO RELATED APPLICATIONS

This application is the National Stage of International Application No. PCT/CH/2008/000351, filed Aug. 18, 2008, which claims benefit under 35 USC §119(a), to Swiss patent application Ser. No. CH 1298/07, filed Aug. 17, 2007.

BACKGROUND OF THE INVENTION

The present invention relates to a method for machining workpieces, in particular for grinding the surface of non-round workpieces, and to a device for carrying out this method.

Methods of the mentioned generic type are already known. In the most primitive manner, such methods are carried out such that the workpiece is clamped within a machining unit and is machined, and, while the workpiece is still clamped, it is measured, for example, by means of a slide gauge or the like. The precision of such a machining operation is low. For more sophisticated and high precision requirements of the machining, the respective workplace is taken out of the machine unit after the machining operation, is clamped in a precise measuring device, and is accurately measured by means of said measuring device. During the respective clamping of the workpiece, i.e., in the measuring device as well as in the machining unit, deviations from the first or previous clamping of the workpiece occur. In addition to that, it is a fact that usually the temperature within the machining unit is higher than the temperature within the measuring device, which has an influence on the measuring data as well. Such negative influences accumulate in such a manner that it is normally impossible to exceed a certain limit of precision.

It is an object of the present invention to eliminate the mentioned disadvantage and further disadvantages of the prior art.

SUMMARY OF THE INVENTION

This object is solved according to the invention with the method for machining workpieces, in particular for grinding the surface of non-round workpieces, in which a workpiece is clamped within a machining unit and that the surface of this workpiece is contactlessly measured by means of a measuring device while the workpiece is clamped within the machine.

The mentioned object is also solved by a device for carrying out the mentioned method, which device measures in a contactless manner and is arranged within the machine in such a manner that it is facing the surface to be measured of the workpiece at least at certain times.

BRIEF DESCRIPTION OF THE DRAWINGS

Hereinafter, exemplary embodiments of the present invention are described in more detail by means of the enclosed drawings. In the Figures.

DETAILED DESCRIPTION OF THE INVENTION

Figure 1:
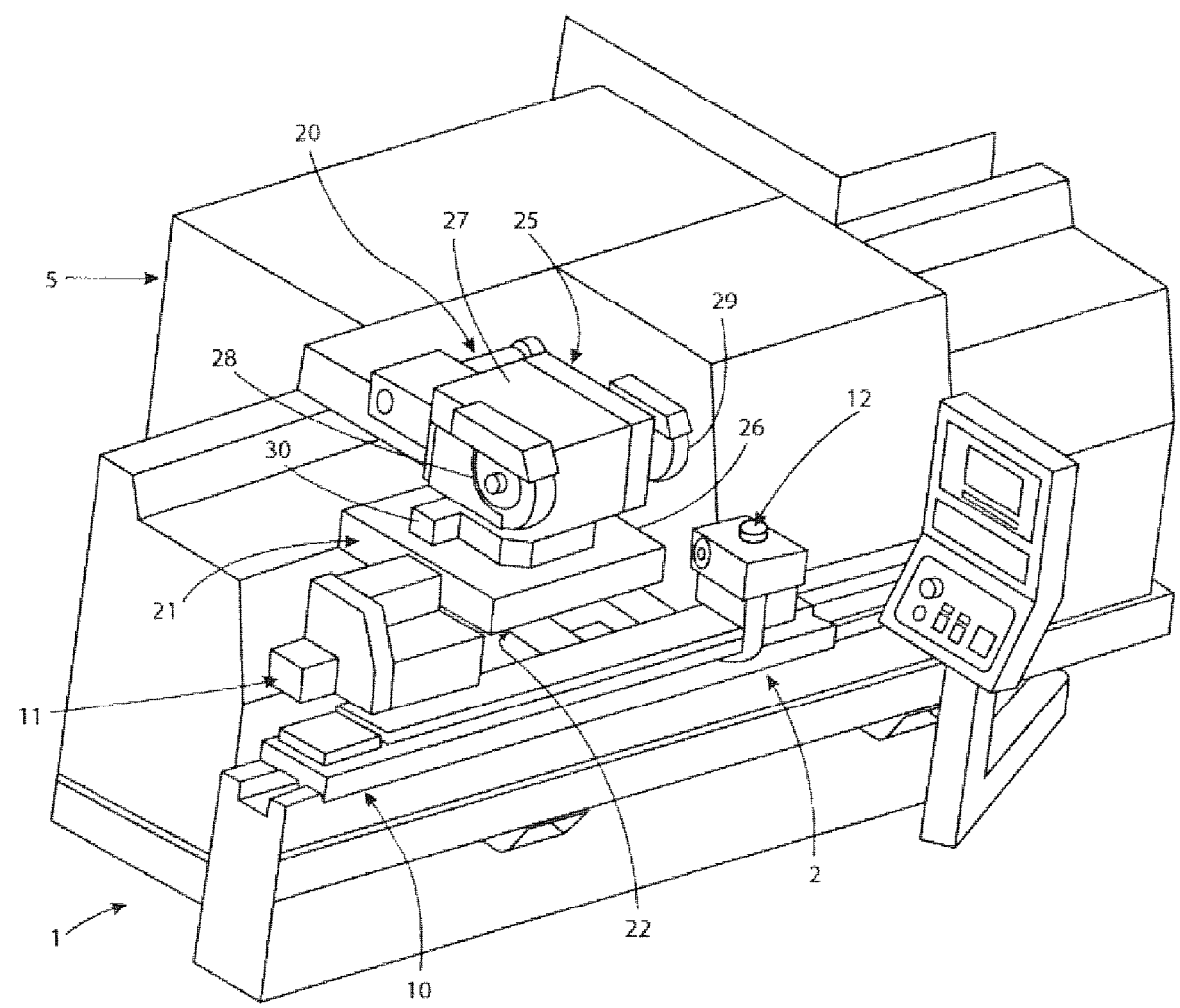
FIG. 1 is a perspective view of a machine for precision grinding with a sensor for scanning the surface workpieces.

A device by means of which the present method can be carried out is illustrated, in perspective view, in FIG. 1. In the illustrated case, this device is a grinding machine with path-controlled (synchronous) X- and C-axis. This device has an elongated machine bed 1 on which a guideway for a fixture 2 is provided, which is intended and configured for holding the workpieces 3 (FIG. 2 or FIG. 3) to be machined. Said workpiece holder 2 has an elongated base plate 10, the bottom side of which is configured in such a manner that said slide 10 is mounted on the machine bed 1 and is movable along the guideway in a longitudinal direction.

Positioned on the top side of the base plate 10 is a headstock 11 known per se and which is attached to the base plate 10 in such a manner that it can be moved along the same in an appropriate guide. Positioned opposite to the spindle 11 a tailstock 12 also known per se. Said tailstock 12 is also movable along the mentioned guide on the top side of the base plate 10. Thus, workpieces 3 to be machined can be clamped between the headstock 11 and the tailstock 12, or can be clamped at least in the headstock 11.

Approximately in the middle of the machine bed 1 and behind the workpiece holder 2, a tool holder 20 of the present device is arranged. Said tool holder 20 comprises a base plate 21 which can be moved perpendicular to the longitudinal direction of the machine bed 1 by means of the guideways 22. On this second slide 21, a tower 25 is attached. This tower 25 has a bottom part 26 fixedly connected with the base plate 21. This tower 25 has further a top part 27 which is mounted rotationally and vertically movable in a horizontal plane in the bottom part 25. This top part 27 of the tower 25 carries grinding wheels 28 and 29 known per se, which are mounted here in a drivable manner. By means of the grinding wheels 28 and 29, workpieces 3 can be machined.

The rotatable part 27 of the tower 25, which can also be designated as turret 27, carries in addition a device 30 for contactless measurement of the workpieces 3 which are clamped in the workpiece holder 2 of the machining unit. This measuring device 30 can be arranged on the turret 27 in such a manner that it is facing the grinding wheels 28 and 29 on the tower 25. Rotating the turret 27 enables, in one position, the grinding wheels 28 and 29 that are facing the workpiece's 3 surface to be machined and to be measured, and in a different position of the turret 27, the measuring device 30 is facing the workpiece's 3 surface to be machined and to be measured. In the illustrated case, this measuring device 30 is a contactless optical sensor which can be configured as a laser triangulation sensor or as a chromatic white light sensor.

The device comprises also a central control unit 5 comprising components controlling the individual work operations of the device, and hence the movements of the individual elements of said device in accordance with appropriate computer programs.

Figure 2:
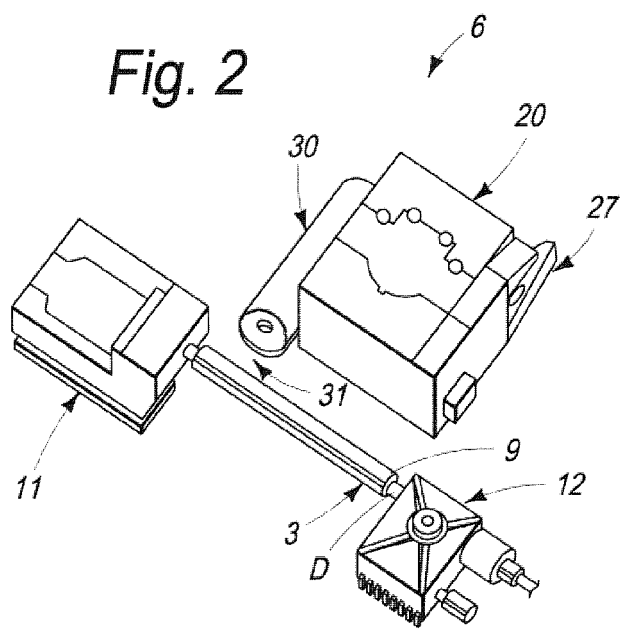
FIG. 2 is a perspective view of a first embodiment of arrangement for processing of workpieces.

FIG. 2 shows perspectively a first embodiment of the measuring arrangement 6 of the present device comprising the headstock 11 and the tailstock 12, between which an elongated workpiece 3 is clamped. Further, this measuring arrangement 6 comprises the optical sensor 30 attached to the tool holder 20. The optical axis O (FIG. 3) of the optical sensor 30 is directed towards the outer surface of the workpiece 3. In FIG. 2, a cone 31 between the workpiece 3 and the sensor 30 is shown. This cone 31 is intended to indicate the path of the light beams between the sensor 30 and the workpiece 3.

Figure 3:
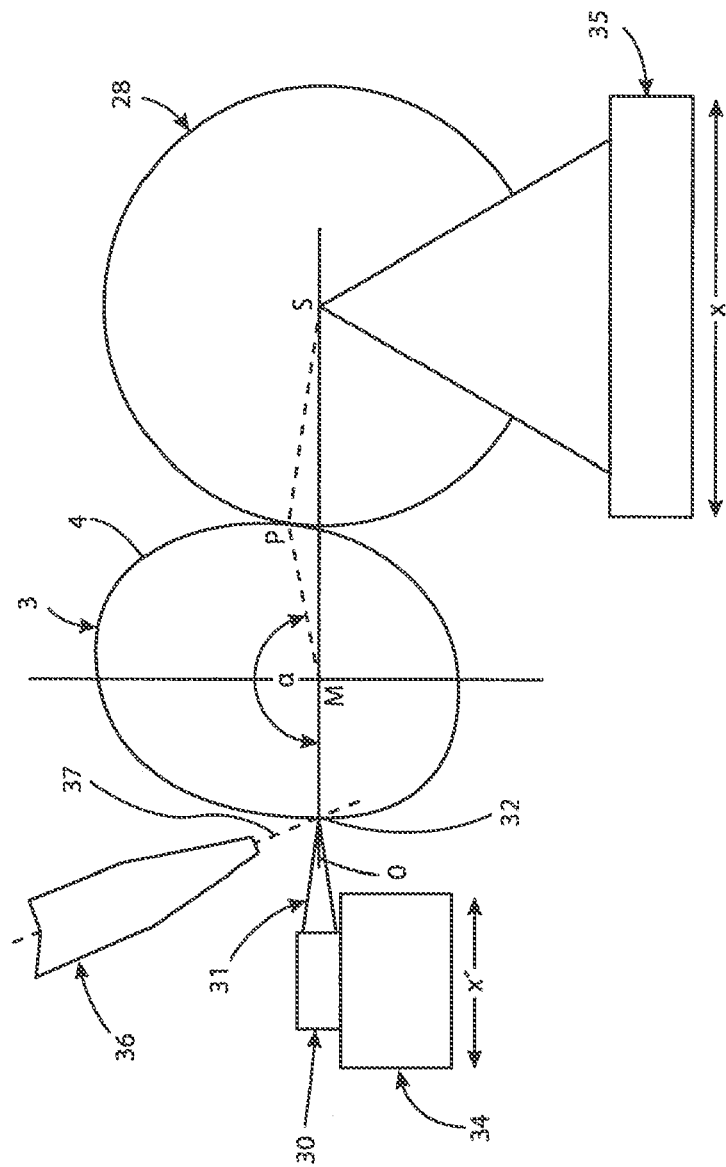
FIG. 3 is a perspective view of a second embodiment of the arrangement for processing of workpieces which allows also for cleaning of workpiece surfaces as well as for a measurement during the machining operation.

The focus of the optical sensor 30 is at the vertex 32 of the cone (FIG. 3). One portion of the whole measuring range of the sensor 30 extends on each of the two sides of the focus 32, and within said portion, the sensor 30 can measure very accurately the extent of the deviation of the outer surface of the workpiece 3 from the desired or required form of this outer surface. This measuring range lies on the rotational axis of the cone 30 and it can have a length of approximately 1 mm.

Basically, the optical sensor 30 should constantly be located at a distance from the outer surface of the workpiece 3, which distance lies within the measuring range of the sensor 30. This can be ensured, for example, in that the sensor 30 is guided with respect to the workpiece by means of a program which is an analog to the program by means of which the tool is guided with respect to the workpiece. Or, the exact distance can be achieved in that the data determined by the distance measurement of the sensor 30 are used as control data for maintaining the distance between the workpiece 3 and the sensor 30. In the arrangement according to FIGS. 1 and 2, this data controls the distance between the tool holder 20 and the workpiece holder 2.

The present device is suitable for the machining of workpieces, in particular for grinding the surface of non-round workpieces 3. The particular characteristic of the present device or of this machining unit is that the workpiece 3 is clamped within the machine, and that the surface of the workpiece 3 can be measured contactless by means of the measuring device while the workpiece 3 is clamped in the tool holder 2 and is rotated. This allows, for example, that the surface of the workpiece 3 can be measured with extreme accuracy without the need to machine the workpiece, and that the values determined thereby can be stored in the control unit 5 for later use.

After clamping the workpiece 3 in the machining unit, the turret 27 can be rotated in such a manner that the desired one of the grinding wheels 28 or 29 is facing the clamped workpiece 3. In accordance with the appropriate program, the surface of the workpiece can be machined or ground by means of the selected grinding wheel. After completion of this machining operation, the turret 27 is rotated in such a manner that the grinding wheel is pivoted away and that the optical sensor 30 is now facing the workpiece 3, and that is done approximately in a manner as shown in FIG. 2. Now, the machined surface of this workpiece 3 is measured contactless by means of the optical measuring device 30 while the workpiece 3 remains clamped within the machine.

According to a further embodiment of the present method, an already finished product serving as a sample for further products is clamped within the workpiece holder 2. The turret 27 is rotated in such a manner that the optical measuring device 30 is facing the surface of said sample piece. The surface of this sample piece is measured by means of the measuring device 30 as accurate as possible so that measuring data for the manufacturing of identical products can be obtained. These sample data are stored in the control unit. These stored measuring data then serve as control data for machining the workpieces 3 with the grinding wheels 28 or 29.

The measuring data which have been determined after a machining operation on the surface of the workpiece 3 during the subsequent measurement are compared with the stored reference data or sample data. The difference determined thereby between the measured data and the reference data results in correction data for the next machining operation on the workpiece 3 without the need of taking the workpiece out of the machine. The machining operations can be carried out alternating with the measuring operations in such a manner that the desired dimensions of the product are approached iteratively.

By means of a further embodiment of the present method, optimum technology parameters can be determined. Considered as technology parameters are, among others, the rotational speed of the workpiece and the infeed rate of the tools. The rotational speed can either be constant or can depend on the position of the workpiece.

For the mentioned purpose, the workpiece 3 is processed in cycles, wherein one processing cycle includes at least one machining operation and at least one measurement of the workpiece surface. The machining parameters, such as the rotational speed of the workpiece, the infeed rate, etc. are changed within one range during the individual processing cycles. After completion of all processing cycles the optimum machining parameters for the machining of the workpiece 3 and/or which of the machining parameters used during the processing cycles have caused possible failures are determined.

The proceeding in detail can be that the extreme values of the machine dependent variables are specified as the range within which those values are found which minimize the deviation of the form of the outer surface of the workpiece, or which allow the highest productivity at a given deviation. For this, the profile on a workpiece is removed in tranches to a nominal dimension and each intermediate profile is measured. For each intermediate profile, one machine dependent variable is varied, and before the last layers, the definitive machining parameters of all preceding measurements are calculated. These variables are used to grind to the nominal dimension. This process is repeated with other extreme values if the desired accuracy of the form of the workpiece surface has not been achieved.

Besides the optical measurement of the machined outer surface or the outer surface to be machined of the workpieces 3 clamped in the machine, also the position of at least one of the lateral surfaces of the workpiece 3, i.e. in Z-direction, can be determined contactlessly by means of the optical measuring device 30. For this, the cone 31 of the optical sensor 30 is utilized. The sensor 30 is moved sideways until its focus lies outside of the outer surface of the workpiece 3. In this position of the sensor 30, the lateral edge 9 (FIG. 2) of the workpiece can come into the path of the light beams forming the conical surface shell of the light cone 31. This interruption of the mentioned beams can be detected and from the position of the sensor 30, the position of the lateral surface of the workpiece can be determined.

The present method can also be used for setting the optical sensor 30 which, for example, is attached on the turret 27. In this embodiment of the present method, a reference piece or product is clamped in the machine and subsequently measured in a calibration cycle. From this calibration cycle data results which can be used as correction data for setting the measuring device 30.

During the setting of a contactless measuring system or of the optical sensor 30, the so-called "calibration", is provided so that the position of the measuring system or the sensor is exactly measured. For this purpose, preferably a workpiece original with known geometry, a so-called "master", is measured first, and these values are then compared with target data of the geometry. Deviations are used as a basis of correction for the calibration. Said calibration can take place at any time, however, preferably at turning-on of the device or after a long interruption. The calibration allows an exact measuring of the geometrical dimensions of the workpiece 3.

If it concerns the grinding of non-round workpieces, the start position of the workpiece 3, i.e., before it is machined, is also of importance. For this purpose, the workpiece 30 is provided with optically scannable markers. These markers are optically scanned after the clamping of the workpiece 3 in the machining unit, and the data obtained are used for the orientation or alignment of the workpiece 3 in the C-direction of the machining unit.

The position of the focus of the light cone can also be utilized to change the distance between the optical scanner 30 and the surface of the workpiece 3. Said change of the position of the scanner 30 takes place depending on the deviation of the surface from the specified form in such a manner that the respectively measured area of the surface of the workpiece remains within the mentioned measuring range of the scanner.

In the first measuring arrangement 6, the machining, i.e. manufacturing, and the measuring, i.e. measuring of the surface of workpieces, can be carried out alternately only because, in order to carry out this work operation, the turret 27 has to be rotated repeatedly. The workpiece 3 is cooled during the grinding process by means of a liquid coolant. This coolant forms a thin layer on the cooled outer surface. However, said coolant layer plays indeed a role for the precision of the grinding process although this coolant layer is very thin. In the first arrangement 6, the layer of the coolant can be removed from the outer surface between machining and measuring in a manner known per se.

FIG. 3 is an enlarged, schematic view of a second embodiment of the processing arrangement 7 which is carried out in such a manner that the manufacturing and the measuring of the surface of workpieces can virtually be carried out at the same time.

The tool 28 is placed on a tool holder 35 which can be configured simpler than illustrated in FIG. 1. This is possible because the tool holder 35 has to be moved only perpendicular to the rotational axis D (FIG. 2) of the workpiece 3. The contactless sensor 30 is directed towards a different area of the outer surface of the workpiece 3. In the case illustrated in FIG. 3, the sensor 30 is placed on the workpiece's 3 side facing the tool 28. However, in this arrangement 7, the sensor 30 needs its own slide 34. In this processing arrangement 7, the form of the outer surface processed by the tool 28 can be measured at virtually the same time. For this, the area to be measured of the outer surface has to cover only the range from the tool 28 to the sensor 30, which is indicated by the angle Alpha in FIG. 3. This range Alpha is in any case less than one rotation of the workpiece, i.e. less than 350 degrees.

In order that the sensor 30 or another contactless measuring system used in the device provide useable measuring results, the measurement surface must be cleaned at least at the point where the measuring system carries out the measurements. In particular, swarf, coolant, etc. must be removed from the surface/measuring surface to avoid errors in the measuring results.

The cleaning of the measuring surface of the workpiece 3 can take place manually before or after it is clamped. The measuring point and its immediate vicinity on the surface of the workpiece are cleaned locally or pointwise. This can take place by a compressed-air jet directed towards the measuring point, by drying with infrared, or by ultrasound. It is particularly advantageous when these measures are carried out in combination, e.g. drying by means of infrared and removal of debris, dust, or swarf by means of compressed air and/or ultrasound.

Instead of said pointwise cleaning at or in the region of the measuring point, according to the motto "Measuring focus=cleaning focus", or complementary to the pointwise cleaning, an additional cleaning step on the workpiece 3 can be provided, and that is done preferably on its entire surface. This can also take place by blowing compressed air onto the surface to be cleaned, whereby particles or liquids sticking on the surface are blown away. Alternatively, said cleaning over the entire surface of the workpiece 3 can also take place by means of brushes, wipers, cloths, etc. (not shown), and/or by rotating the workpiece 3 with high speed, whereby the solid or liquid impurities are wiped off and/or are centrifuged by centrifugal force. Such brushes or wipers can be configured as rotatable objects which can preferably be coupled with the grinding wheels 28, 29, which are rotatable as well.

The previously described layer of liquid coolant can be removed from the outer surface of the workpiece 3 on the fly between the tool 28 and the sensor 30. This can be achieved, for example, by means of a nozzle 36 from which an intense air jet 37 streams out. This air jet 37 is pointed at the one point of the outer surface, or just before it, where the focus 32 of the sensor 30 is placed. Apart from that, a mechanical wiper (not shown) which is arranged upstream of the sensor 30, can also be used. It is also conceivable to use a mathematical method for the consideration of the coolant layer. The coolant layer has characteristic properties, for example, a certain thickness. These properties can be calculated or measured, and the data obtained in this manner are added as correction data to the data provided by the sensor 30. In this manner, the deviations caused by the coolant layer can be filtered out.

Figure 4:
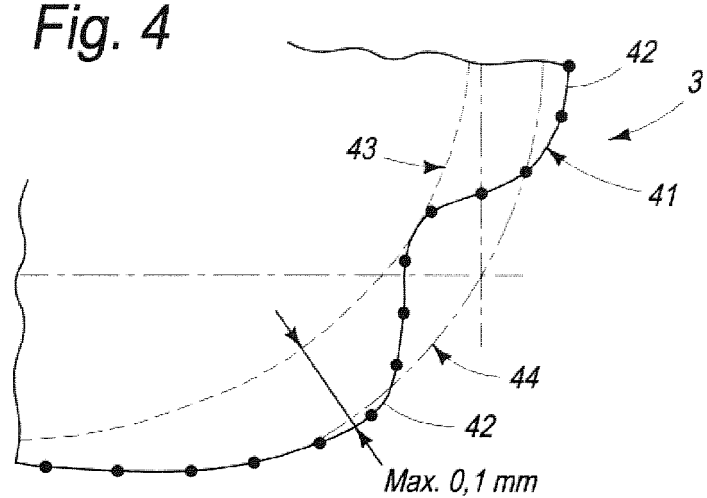
FIG. 4 shows a segment of a cross section through an unmachined workpiece with a round outer surface.

FIG. 4 shows a segment from a cross section through an unmachined workpiece 3 with a curved outer surface. This outer surface comprises the effective outer surface 41 of the still unground workpiece 3, which shows deviations 42 from the desired curved outer surface 43 of the workpiece The workpiece 3 that still has the deviations 42 is first ground with a grinding allowance 44 and then measured. The information about this actual contour 44 is incorporated Into the control program of the target contour 43, and the workpiece 3 is ground with the program modified in this manner to the nominal dimension 43. The "corrected" target contour, in turn, is the basis for the generation of the parallel contour of the following workpiece so that the target contour iteratively approaches an ideal target.

Figure 5:
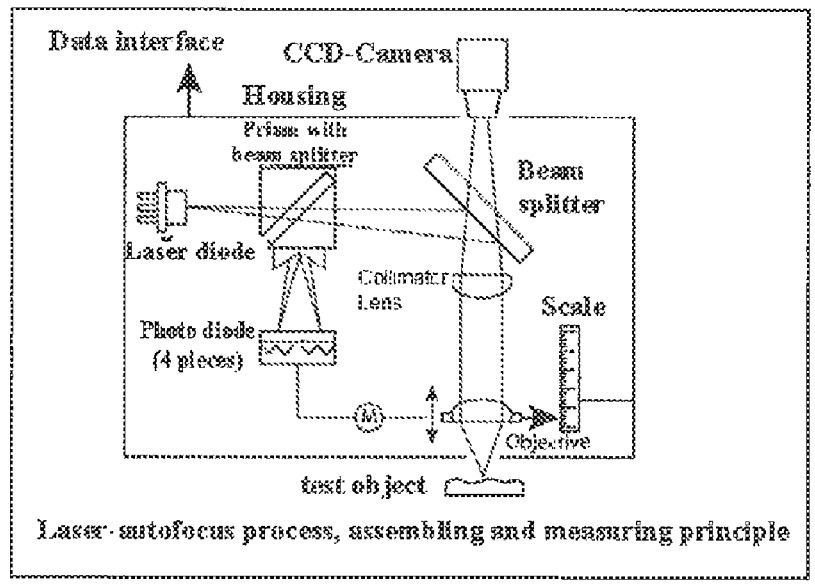
FIG. 5 shows the sensor of FIG. 1 which is configured as a laser in an autofocus setup.
Figure 6:
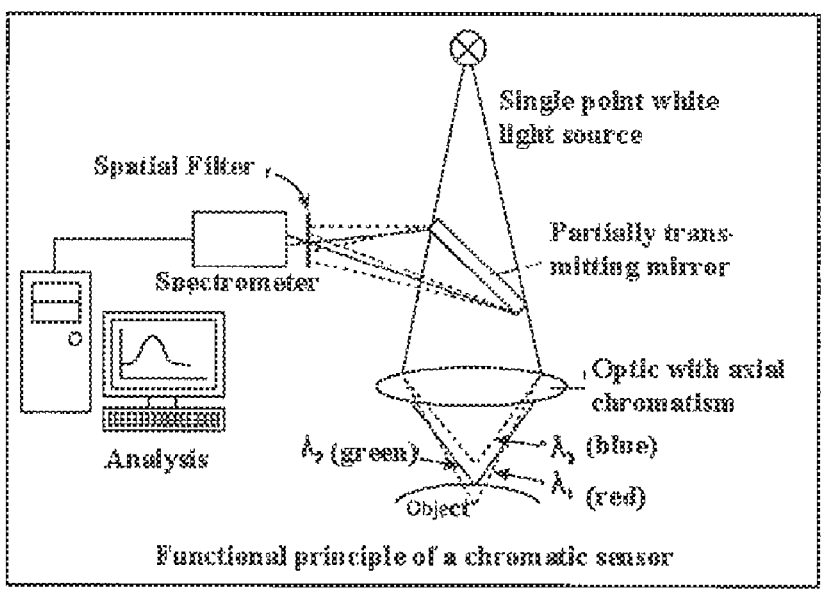
FIG. 6 shows the functional principle of an achromatic sensor.
Figure 7:
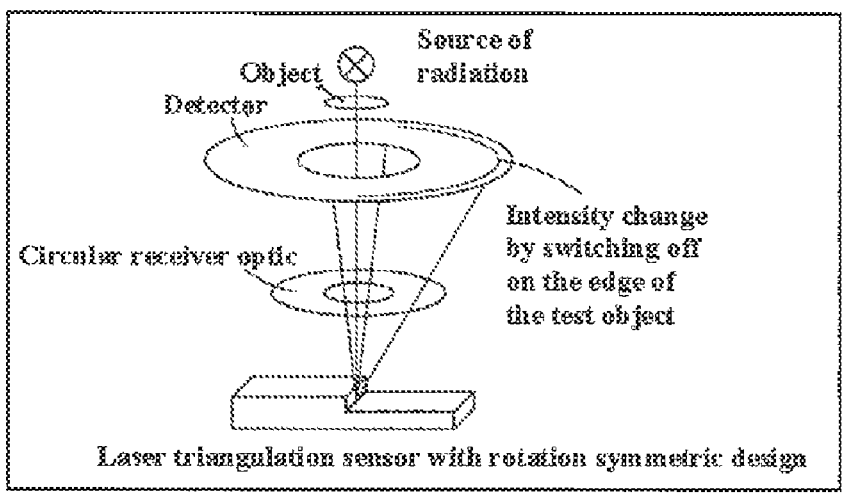
FIG. 7 shows a laser triangulation sensor with a rotation-symmetric construction.
Figure 8:
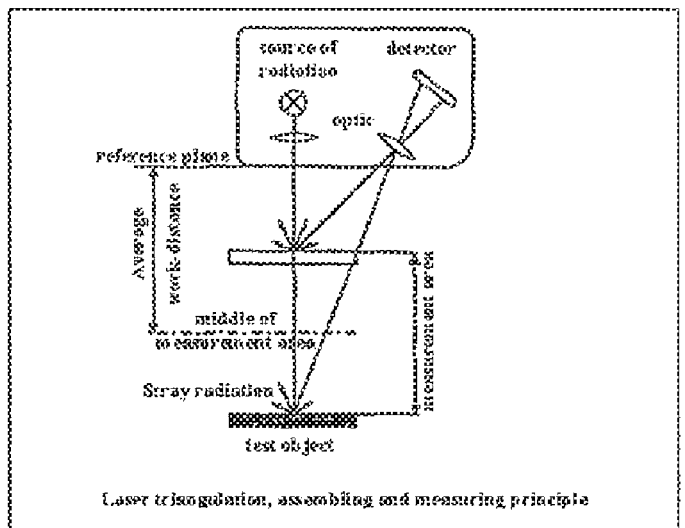
FIG. 8 shows the principle of laser triangulation.
Figure 9:
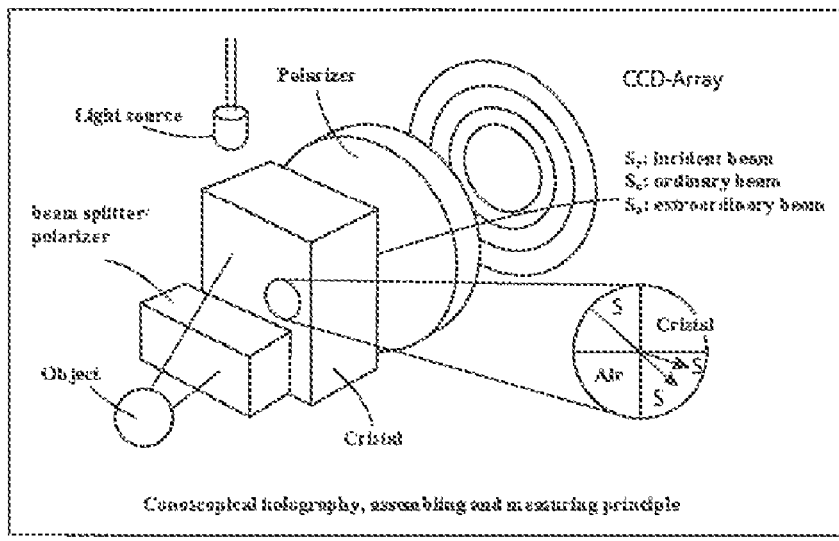
FIG. 9 shows the principle and structure of the conoscopic holography.
Figure 10:
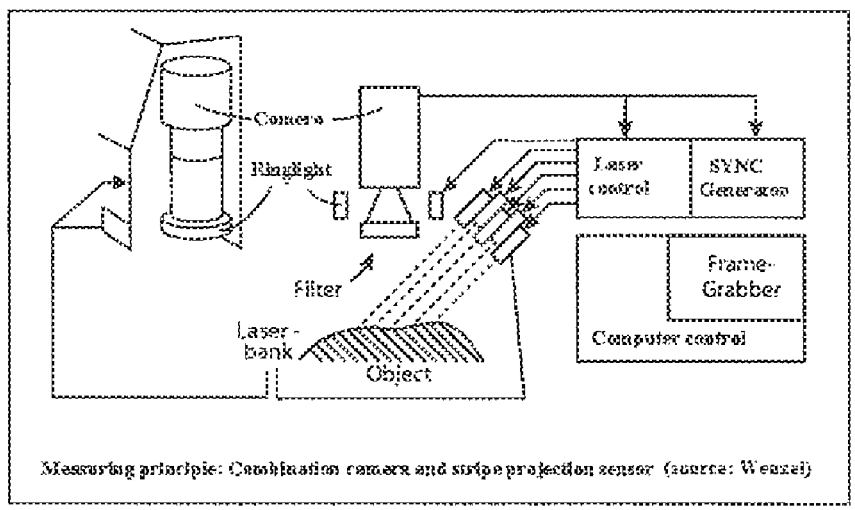
FIG. 10 shows a combined camera and fringe projection sensor.

The optical sensor 30 can be implemented in a different manner and in a manner known per se. According to FIG. 5, the sensor 30 can be configured as a laser in an autofocus setup. In FIG. 6, the functional principle of an achromatic sensor is illustrated. FIG. 7 shows a laser triangulation sensor with a rotation-symmetric construction. FIG. 8 shows the principle of the laser triangulation. FIG. 9 illustrates the principle and structure of the conoscopic holography. And FIG.

10 shows a combined camera and fringe projection sensor which can be advantageously used for the implementation of the present method.

With the contactless sensor 30, the actual contour of a curved surface can be detected very accurately. Because the present way of measuring the actual contour is so accurate, the position of the blank in the grinding machine can be determined very accurately. This offers the possibility that the blanks intended for grinding can have a grinding allowance which is smaller than previously possible. Such a small grinding allowance reduces the grinding time. Thereby, the productivity of the grinding process is increased.

The invention claimed is:

1. A method for machining workpieces, in particular for grinding the surface of non-round workpieces, the method including the steps of:
   (a) clamping a workpiece within a machining unit;
   (b) machining the workpiece;
   (c) without unclamping the workpiece, contactlessly measuring the workpiece using an optical measuring device having a chromatic sensor with a characteristic measuring range; and
   (d) machining and measuring the workpiece in an alternating manner to iteratively approach the desired measurements of a specified form by adjusting the distance between the optical measuring device and the surface of the workpiece depending on there being a deviation of the surface from the specified form so that a respectively measured area of the surface of the workpiece remains within the measuring range of the optical sensor.

2. The method according to claim 1, wherein first a reference piece is measured as accurately as possible so that measuring data for manufacturing of further products can be obtained, that these measuring data are stored, and that these measuring data can be used in situ as control data for the machining of the workpieces and as reference data for measuring the workpieces as the workpieces are machined.

3. The method according to claim 2, wherein the measuring data determined after machining the workpiece and during the subsequent measuring of the workpiece are compared with the stored reference data and that the difference between the measured data and the reference data are used as correction data for the next machining operation without the workpiece being unclamped and taken out of the machining unit.

4. The method according to claim 1, wherein the workpiece is processed in cycles, wherein one processing cycle includes at least one machining operation and at least one measuring operation of the workpiece, that machining parameters are changed within one range during individual processing cycles, and that after completion of all processing cycles, the machining parameters are analyzed in order to improve future processing.

5. The method according to claim 1, wherein besides optical measuring of a machined outer surface or an outer surface to be machined of the workpiece clamped within the machine, also the position of at least one of the lateral surfaces of the workpiece in a Z-direction is determined optically.

6. The method according to claim 1, wherein a reference piece or product is clamped within the machining unit and is subsequently measured in a calibration cycle, and that data resulting from the calibration cycle are used as correction data for setting the optical measuring device.

7. The method according to claim 1, wherein the workpiece is provided with optically scannable markers, that these markers are scanned after the clamping of the workpiece within the machining unit, and that data obtained in this manner are used for orientation or alignment of the workpiece in a C-direction in the machining unit.

8. A device for carrying out the method according to claim 1, wherein the machining unit has a device with an optical sensor measuring in a contactless manner and that said measuring device is arranged within the machine in such a manner that it is facing a surface to be measured of the workpiece at least at certain times.

9. The device according to claim 8, wherein the machining unit is a grinding machine with path controlled (synchronous) X- and C-axis.

10. The device according to claim 8, wherein the measuring device includes a camera and fringe projection sensor.

11. A method for machining workpieces, the method having the following steps:
   clamping a workpiece within a machining unit;
   contactlessly measuring the surface of this workpiece by means of a measuring device including a chromatic sensor with a characteristic measuring range, the measuring taking place while the workpiece is clamped within the machine;
   carrying out machining operations alternating with the measuring operations and in such a manner that the desired dimensions of the product are approached iteratively; and
   changing the distance between the optical scanner and the surface of the workpiece so long as there is a deviation of the surface from the specified form so that the respectively measured area of the surface of the workpiece remains within the measuring range of the scanner.

12. The method according to claim 11, wherein first a reference piece is measured as accurately as possible so that measuring data for manufacturing of further products can be obtained, that these measuring data are stored, and that these measuring data can be used in situ as control data for the machining of the workpieces and as reference data for measuring the workpieces as the workpieces are machined.

13. The method according to claim 12, wherein the measuring data determined after machining the workpiece and during the subsequent measuring of the workpiece are compared with the stored reference data and that the difference between the measured data and the reference data are used as correction data for the next machining operation without the workpiece being unclamped and taken out of the machining unit.

14. The method according to claim 11, wherein the workpiece is processed in cycles, wherein one processing cycle includes at least one machining operation and at least one measuring operation of the workpiece, that machining parameters are changed within one range during individual processing cycles, and that after completion of all processing cycles, the machining parameters are analyzed in order to improve future processing.

15. The method according to claim 11, wherein besides optical measuring of a machined outer surface or an outer surface to be machined of the workpiece clamped within the machine, also the position of at least one of the lateral surfaces of the workpiece in a Z-direction is determined optically.

16. The method according to claim 11, wherein a reference piece or product is clamped within the machining unit and is subsequently measured in a calibration cycle, and that data resulting from the calibration cycle are used as correction data for setting the optical measuring device.

17. The method according to claim 11, wherein the workpiece is provided with optically scannable markers, that these markers are scanned after the clamping of the workpiece within the machining unit, and that data obtained in this manner are used for orientation or alignment of the workpiece in a C-direction in the machining unit.

18. A device for carrying out the method according to claim 11, wherein the machining unit has a device with an optical sensor measuring in a contactless manner and that said measuring device is arranged within the machine in such a manner that it is facing a surface to be measured of the workpiece at least at certain times.

19. The device according to claim 18, wherein the machining unit is a grinding machine with path controlled (synchronous) X- and C-axis.

20. The device according to claim 18, wherein the measuring device includes a camera and fringe projection sensor.

* * * * *

UNITED STATES PATENT AND TRADEMARK OFFICE
CERTIFICATE OF CORRECTION

| | | |
|---|---|---|
| PATENT NO. | : 8,403,725 B2 | Page 1 of 1 |
| APPLICATION NO. | : 12/673591 | |
| DATED | : March 26, 2013 | |
| INVENTOR(S) | : Daniel Honegger et al. | |

It is certified that error appears in the above-identified patent and that said Letters Patent is hereby corrected as shown below:

In the Specifications

In Col. 2, line 48, replace the phrase "the bottom part 25." with --the bottom part 26.--

In Col. 4, line 12, replace the phrase "without the need of taking the workpiece out" with --without the need of taking the workpiece 3 out--

In Col. 4, line 23, replace the phrase "For the mentioned purpose" with --Referring now to Fig. 11, for the mentioned purpose--

In Col. 4, line 50, replace the phrase "Besides the optical measurement" with --Referring now to Fig. 12, besides the optical measurement--

In Col. 5, line 15, replace the phrase "If it concerns" with --Referring now to Fig. 13, if it concerns--

In Col. 5, line 63, replace the phrase "less than 350 degrees" with --less than 360 degrees--

In Col. 6, line 50, replace the phrase "of the workpiece The" with --of the workpiece 3. The--

In Col. 6, line 53, replace the phrase "is incorporated Into" with --is incorporated into--

Signed and Sealed this
Second Day of July, 2013

Teresa Stanek Rea
*Acting Director of the United States Patent and Trademark Office*